United States Patent [19]

Joshi

[11] 4,192,664

[45] Mar. 11, 1980

[54] METHOD OF MAKING A CELLULAR BODY FROM A HIGH SILICA BOROSILICATE COMPOSITION

[75] Inventor: Shridhar B. Joshi, Pittsburgh, Pa.

[73] Assignee: Pittsburgh Corning Corporation, Pittsburgh, Pa.

[21] Appl. No.: 842,610

[22] Filed: Oct. 17, 1977

Related U.S. Application Data

[63] Continuation-in-part of Ser. No. 743,218, Nov. 19, 1976, abandoned.

[51] Int. Cl.² ............................................. C03B 19/08
[52] U.S. Cl. .................................... 65/22; 106/40 V; 106/41
[58] Field of Search .................... 65/22; 106/41, 40 V

[56] References Cited

U.S. PATENT DOCUMENTS

| 2,582,852 | 6/1948 | Shoemaker | 106/40 V |
| 3,362,805 | 1/1968 | Schulz | 65/22 |
| 3,874,861 | 4/1975 | Kurz | 65/22 X |

FOREIGN PATENT DOCUMENTS

| 188636 | 11/1966 | U.S.S.R. | 65/22 |

*Primary Examiner*—Arthur D. Kellogg
*Attorney, Agent, or Firm*—Stanley J. Price, Jr.; John M. Adams

[57] ABSTRACT

An intimate mixture of an amorphous silica potassium oxide, boric oxide, alumina and a cellulating agent is subjected to a temperature of between 1390° C. to 1450° C. for a sufficient time to coalesce the mixture and gasify the cellulating agent and form a cellular body. The mixture is prepared by first forming a slurry and, drying the slurry to form aggregates, and are thereafter comminuted if necessary to form a pulverulent batch. The pulverulent batch is heated in a cellulating furnace to a foam-like mass which is comminuted to form a precellulated material. The precellulated material is mixed with additional cellulating agent and pulverulent batch in preselected proportions and heated in a furnace to gasify the cellulating agent to form a cellular body. Alternatively alumina, boric oxide, an alkali metal salt and a cellulating agent are comminuted and mixed in a ball mill. Thereafter, amorphous silica is added to form a mixture containing more than 80% silica. The mixture is milled in the ball mill and subjected to a temperature only sufficient to coalesce the mixture and gasify the cellulating agent to form a cellular body.

30 Claims, 2 Drawing Figures

METHOD OF MAKING A CELLULAR BODY FROM A HIGH SILICA BOROSILICATE COMPOSITION

CROSS REFERENCE TO RELATED APPLICATIONS

This application is a continuation-in-part of U.S. patent application Ser. No. 743,218 filed Nov. 19, 1976 now abandoned entitled "A Method Of Making A Cellular Body From A High Silica Borosilicate Composition".

BACKGROUND OF THE INVENTION

1. Field of the Invention

This invention relates to a method of making a cellular body from a high borosilicate composition, and more particularly, to a method of cellulating high borosilicate compositions by forming an intimate mixture of the pulverulent constituents and a portion of previously cellulated high borosilicate compositions and thereafter subjecting the mixture to cellulating temperatures to form a cellular body.

2. Description of the Prior Art

Conventional glasses that are melted in conventional glass melting tanks contain about 70% by weight silica. High silica glasses that are melted in special high temperature melting tanks contain about 80% by weight silica. It is extremely difficult to melt glasses containing above 80% by weight silica or above 90% by weight of a combination of silica and alumina in either conventional glass melting tanks or in the special high temperature glass melting tanks.

The process of melting the constituents in a glass tank consists of decomposing all or some of the constituents, forming a liquid mixture of the constituents, removing the trapped gases and improving the homogeneity of the molten mass. The process of removing gases and improving the mixing and homogeneity depends on a number of parameters especially the viscosity of the molten mass. The melting process requires liquidity and a reduction in the viscosity of the molten mass and usually takes place in the highest temperature zone of the glass melting tanks. When attempts are made to melt the glass compositions containing above 80% by weight silica and a mixture of silica and alumina that comprises above 90% by weight of batch in special high temperature glass melting tanks, it has been observed that the temperatures obtained are high enough to just melt the batch and are not high enough to create the thermal currents necessary to intimately mix and obtain homogeneity of the constituents in the vitrified product.

In the high temperature glass melting tanks, the corrosion rate of refractories is extremely high, and the loss of fluxes for long periods at this high melting temperature is both undesirable and unacceptable. In high temperature melting tanks, the top temperature is restricted to slightly above 1600° C. due to the restrictions on the capabilities of the firing systems and due to the limitations of the silica crowns in the melting tank. Attempts have been made to obtain high melting temperatures and reduce the above discussed problems. Electric melting has been utilized to obtain higher temperatures in the body of the melting mass while maintaining lower temperatures at the surface of the melting mass as well as at the refractory interfaces. The method of electric melting can generate temperatures in excess of 1700° C. in the body of the melting mass while maintaining lower temperatures at the refractory interfaces.

In electric melting, the heat is generated by the ionic conduction taking place between two electrodes positioned in the glass batch with the glass batch acting as the electrolyte. The capacity of the glass batch to carry ionic current depends on the mobility of the various ions contained in the glass batch. In a high silica glass, the monovalent cations carry more than 90 percent of the current. Among the commonly occurring monovalent cations, i.e. $Na^+$, $K^+$ and $Li^+$, the $Na^+$ ions have a much high mobility than $K^+$ ions. Therefore, in a glass composition where it is more desirable and preferred to have $K^+$ ions rather than $Na^+$ ions for reasons later discussed, it is difficult to attain the desired temperatures. For example; with a preferred composition that contains less than 3 percent by weight potassium oxide ($K_2O$), it is extremely difficult with electric melting to attain the high levels of currents and the prerequisite high temperatures required for attaining a suitable homogeneous melt.

In a conventional glass tank, the pulverulent constituents, commonly referred to as the glass batch, are fed to the tank through a suitable opening and are vitrified by melting. The melt, however, is not homogeneous in composition. To attain homogeneity, it is necessary to increase the temperature of the molten glass to provide thermal currents in the molten body. This results in a mixing of the molten material, and the composition thus becomes more homogeneous. Diffusion of the cations increases at the higher temperatures to also increase the homogeneity of the molten mass.

Removing the molten mass from the melting tank requires the molten mass to have certain characteristics, as for example, a sufficiently low viscosity to permit the glass to flow out of the tank. Again, these flow characteristics can be obtained by attaining sufficiently high temperatures in the melt. The temperatures required for obtaining homogeneity of the conventional glass compositions and for obtaining the required degree of fluidity are substantially the same, although the temperature for attaining homogeneity may be slightly higher. The level of temperature required to obtain homogeneity of the conventional glass compositions or for obtaining the necessary fluidity for conventional glass compositions is much lower than the temperature required to attain both the homogeneity and fluidity of glasses containing above 80 percent silica or having above 90 percent by weight of a combination of silica and alumina. In fact, the necessary high temperature to obtain both fluidity and homogeneity of the above high silica glass compositions cannot be commercially obtained in existing melting tanks now in common use.

In copending application, Ser. No. 685,054, entitled "A Pulverulent Borosilicate Composition And A Method Of Making A Cellular Borosilicate Body Therefrom", there is disclosed a process for preparing a cellular body from high silica borosilicate glass which includes preparing an aqueous slurry from an intimate mixture of colloidal silica, caustic potash, boric acid and alumina. The slurry is dried, and the aggregates are comminuted and thereafter calcined and rapidly quenched to form a ceramic frit. The ceramic frit is thereafter comminuted and mixed with a cellulating agent and introduced into a cellulating furnace and subjected to cellulating temperatures to form cellular bodies.

The high silica borosilicate cellular body formed according to the process set forth in the above copending application has the desirable properties of resisting degradation by an electrolytic salt bath and corrosive gases at elevated temperatures. The cellular body further retains physical integrity, especially insulating properties, under a load of about 17 p.s.i. at about 700° C.

The above process now makes it possible to obtain cellular ceramic bodies which have the above desirable properties without the use of a melting tank. The process as described, however, requires calcining the entire batch and rapidly quenching the calcined material. As stated in the specification, it is preferred to use a plasma arc flame to calcine and rapidly quench the frit to prevent devitrification of the calcined material. There is a need to obtain a high silica borosilicate cellular body that has the above-discussed desirable properties without calcining the glass batch.

Attempts have also been made in the past to make cellular ceramic bodies from either naturally occurring glasses such as volcanic ash or from other materials that contain silica. For example, U.S. Pat. No. 2,466,001 and 3,174,870 disclose processes for making cellular products from volcanic ash, feldspar and granite. U.S. Pat. No. 3,441,396 discloses a process for making cellular materials from pulverulent materials that include fly ash. None of these processes however are directed to a process where a cellular body is formed from a high borosilicate composition such as a composition containing more than 80% by weight silica.

SUMMARY OF THE INVENTION

This invention is directed to a method of making a cellular body from a high silica borosilicate glass composition by preparing a pulverulent homogeneous mixture from constituents comprising amorphous silica, alumina, boric oxide, alkali metal oxide and a cellulating agent with the mixture containing more than 80% by weight amorphous silica. The pulverulent homogeneous mixture is thereafter subjected to a temperature sufficient to coalesce the homogeneous mixture and gasify the cellulating agent to form a cellular body having a substantially uniform cell structure. The constituents of the pulverulent homogeneous mixture expressed in weight percent and as oxides comprises between about 80 and 88% amorphous silica with about 88% by weight amorphous silica being most preferred, about 4% alumina, between about 5 and 13% boric oxide with about 7% boric oxide being most preferred and between about 1 and 3% alkali metal oxide with about 1% alkali metal oxide being most preferred. The cellulating agent in the admixture expressed as a percent by weight of the other constituents comprises between about 0.2% and 0.5% carbon with about 0.4% carbon being preferred and between about 0.3% and 0.8% antimony trioxide with about 0.5% antimony trioxide being preferred. A portion of the cellular body formed from the above mixture may be comminuted and added to and mixed with the pulverulent homogeneous mixture. It is preferred to mix between about 15 to 40% by weight of the comminuted cellular body with between about 60 to 85% by weight of the pulverulent homogeneous mixture.

In one embodiment the constituents are intimately mixed as a slurry and the slurry is thereafter dried to form particles of the solid constituents in the slurry. The solid constituents or aggregates are thereafter comminuted to a relatively fine size and introduced into the cellulating furnace. The comminuted aggregates or particles, hereinafter referred to as the pulverulent batch, is subjected to elevated cellulating temperatures within the cellulating furnace to coalesce the pulverulent batch and gasify the cellulating agent and form a foam-like mass having a nonuniform cell structure. The foam-like mass is thereafter comminuted to form a precellulated material which is mixed with additional cellulating agent. The mixture of precellulated material and cellulating agent is thereafter subjected to a temperature sufficient to coalesce the precellulated material and gasify the cellulating agent and cellulate the precellulated material to form a cellular body having substantially uniform cell structure.

In another embodiment alumina, boric oxide, alkali metal oxide in the form of potassium carbonate and a cellulating agent are comminuted to form a first mixture. Thereafter amorphous silica is added to the first mixture to form a second mixture that contains more than 80% by weight amorphous silica. The second mixture is further mixed to form an intimate homogeneous mixture. The second mixture is heated to an elevated temperature sufficient to coalesce the second mixture and gasify the cellulating agent and form a cellular body having a substantially uniform cell structure. A portion of the cellular body may be comminuted and added to the first mixture before the amorphous silica is added to the first mixture to form the second mixture.

More specifically the mixture of alumina, boric oxide, alkali metal carbonate, a cellulating agent and a portion of the scrap trimmings from previously cellulated material are introduced into a ball mill and subjected to comminution for a sufficient period of time to intimately mix the constituents and form a first mixture containing a preselected amount of comminuted scrap trimmings. Thereafter amorphous silica is added to the first mixture in the ball mill to form a second pulverulent mixture. The second pulverulent mixture is thereafter positioned in suitable covered molds and introduced into a cellulating furnace. The molds are immediately subjected to a temperature of 1200° C. and maintained at that temperature until the carbon is fixed in the mixture. The temperature of the furnace is then increased at a preselected rate to about 1390° C., where it is maintained for a sufficient period of time to coalesce the mixture and gasify the cellulating agent and form a cellular body that has a substantially uniform cell structure. Thereafter, the temperature to which the cellular body is subjected is rapidly reduced to a temperature of about 760° C. where it is maintained for a sufficient period of time to permit the cellular body to cool. The cellular body is thereafter slowly cooled from 760° C. to ambient temperature and trimmed and shaped to form a cellular body having a desired configuration.

DESCRIPTION OF THE PREFERRED EMBODIMENTS

Figure 1:
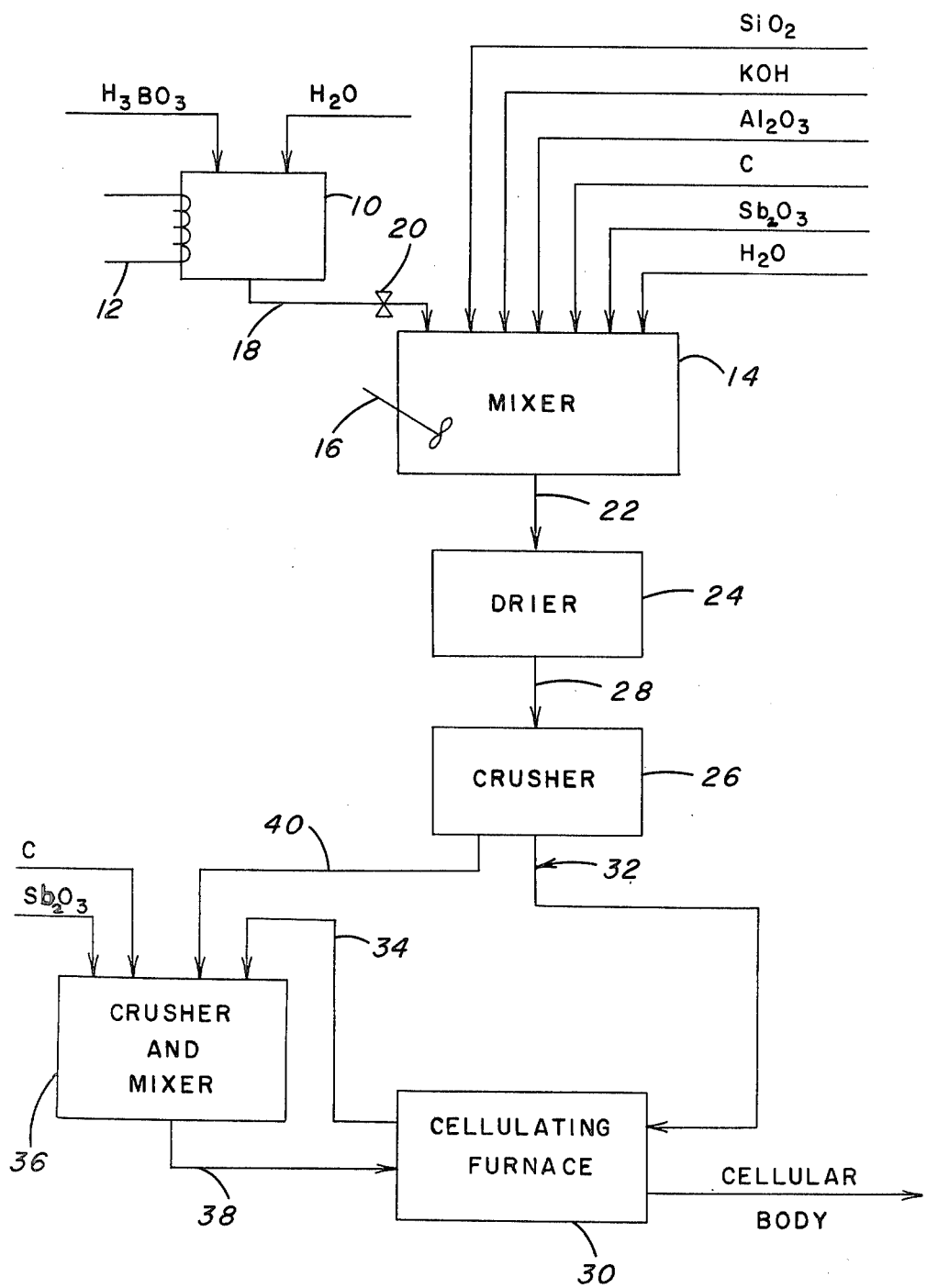
FIG. 1 is a flow diagram of the process for making the cellular body in which the constituents are admixed in slurry form, dried and comminuted before they are introduced into the cellulating furnace.

The process for making cellular bodies from high silica borosilicate glass compositions includes first forming a boric acid solution by admixing boric acid and water at an elevated temperature in a suitable container 10. A heater 12 may be employed to elevate the temperature of the water to dissolve the boric acid and form a solution thereof.

In a separate mixing tank 14, an aqueous slurry is formed of silica (preferably an amorphous, precipitated, hydrated silica), an alkali metal hydroxide in the form of KOH, alumina (preferably in the form of an alpha monohydrate) and cellulating agents, i.e. carbon black and antimony trioxide. Sufficient alkali metal hydroxide is added to the slurry to provide a pH of about 10. The slurry is subjected to high shear mixing by the mixer 16, and a preselected amount of boric acid solution is introduced into the mixer 14 through a conduit 18 and controlled by valve 20. After the boric acid solution is added and mixed again by high shear mixing with the slurry, additional silica is added to the slurry until the slurry contains about 22 percent solids by weight.

A suitable composition for making the precellulated material for the process consists of the following range of constituents expressed in percent by weight. The cellulating agents, i.e. the Carbon Black and $Sb_2O_3$ are expressed in weight percent of the other constituents.

| | |
|---|---|
| 80–88 | $SiO_2$ |
| 1–3 | $K_2O$ |
| 5–13 | $B_2O_3$ |
| 4 | $Al_2O_3$ |
| 0.5 | Carbon Black |
| 0.5 | $Sb_2O_3$ |

It should be understood that other types of cellulating agents may also be employed to provide the necessary gases during the cellulation process for providing the high surface area during cellulation. It has been found, however, that the presence of a cellulating agent that is a mixture of carbon, preferably channel carbon, and antimony trioxide inhibits substantially the transformation of the material to cristobalite after heating. The antimony trioxide is also believed to serve as a flux or provide a fluxing action and thus causing a foaming action as the temperature increases during cellulation. Throughout the specification, the terms cellulating agent and cellulating agents are used interchangeably to designate a material or mixture of materials that gasify during the cellulation process. Channel carbon also known as channel black is carbon manufactured by the incomplete combustion of natural gas collected on a cold channel.

The slurry, after the high shear mixing in mixer 14, is withdrawn therefrom through conduit 22 and introduced into a drier 24. The drier 24 may be any conventional drier, however, a spray drier is preferred which removes the water from the slurry and forms discrete spherical agglomerates. Where a conventional pan drier is employed, the dried agglomerates are introduced into a crusher 26 through conduit 28 where the agglomerates are reduced to a size suitable for cellulation in the cellulating furnace 30. It has been found that spray drying forms spherical particles having a size less than 20 mesh Tyler Standard Screen, and the drying is fast enough to retain the $B_2O_3$ on the particles. Where pan drying is employed, a drying temperature schedule must be employed to retain the $B_2O_3$ on the aggregates. Therefore, although the crusher 26 is illustrated in the drawing where particles of a suitable size are obtained, the crusher 26 may be omitted.

A portion of the pulverulent batch from the crusher is preferably positioned in a container and conveyed by conveyor 32 to the cellulating furnace 30. Within the cellulating furnace 30, the pulverulent batch in the container is subjected to a heating schedule which includes subjecting the pulverulent batch to a temperature of about 1450° C. for a preselected period of time, as for example, 90 minutes. While subjected to the cellulating temperature, the pulverulent batch coalesces and cellulates to form a foamed mass having a nonuniform cellular structure with a density of about 25 lbs./ft.$^3$. The container with the foamed mass is withdrawn from the cellulating furnace by conveyor 34 and the foamed mass is introduced into a crusher mixer 36. The crushed foamed mass is referred to as precellulated material. Additional cellulating agents, such as carbon and antimony trioxide, are introduced into the crusher mixer 36 and are mixed with the precellulated material. Where desired, the precellulated material with the added cellulating agents may be withdrawn from the crusher mixer 36, positioned in a container and introduced by conveyor 38 to the cellulating furnace for a second cellulation step. The product obtained is a cellular body having a substantially uniform cell structure and the previously discussed desirable properties.

The pulverulent batch material from crusher 26 is also introduced by means of conveyor 40 into the crusher mixer 36. The pulverulent batch and precellulated material are admixed in mixer 36 in preselected proportions with the additional cellulating agents and introduced through conveyor 38 to the cellulating furnace 30. It has been found that a mixture of between 70 and 80 percent by weight pulverulent batch and between 20 and 30 percent by weight precellulated material will cellulate in furnace 30 and form cellular bodies having substantially uniform cells and the previously discussed desirable properties. The mixture introduced into the cellulating furnace 30 through conveyor 38 may be subjected to substantially the same heating schedule as the precellulated material.

The silica in the above-described borosilicate composition is preferably a colloidal silica of a micron size. A fumed silica formed by the burning of $SiFL_4$ or $SiCL_4$ may be used. A preferred silica is an amorphous, precipitated, hydrated silica sold by PPG Industries, Pittsburgh, Pennsylvania, under the trademark, Hi-Sil-EP. This amorphous, precipitated, hydrated silica has a surface area (B. E. T.) of between 50–70 sq. m./gm. A typical analysis of this amorphous, precipitated, hydrated silica is as follows:

| | |
|---|---|
| $SiO_2$ (as shipped, dry basis) | 94.0% |
| NaCl | 1.7% |
| CaO | 0.80% |
| $R_2O_3$ (Fe + Al) | 0.63% |
| pH in 5% Water Suspension | 7.0% |
| Loss at 105° C. (as shipped) | 5.3% |
| Cu and Mn (Combined Total) | 0.003% |
| Surface Area (B. E. T.) | 60 sq. m./gm. |
| Ultimate Particle Size | 0.04 microns |
| Refractive Index | 1.46 |
| DBP Absorption | 182 ml/100 gm. |
| % Retained on 325 Mesh | 0.3 (pellets) |

-continued 0.07 (powder)

It is believed that the high surface area of the amorphous, precipitated silica contributes substantially to forming an intimate admixture with the alumina and further provides a substantial area that may be coated with $B_2O_3$ flux. Another type of amorphous silica which is suitable for use in the above described borosilicate composition is an amorphous silica sold by Cabot Corporation, Boston, Massachusetts, under the tradename CAB-O-SIL.

Any suitable alumina of colloidal size may be used as a constituent for the borosilicate composition. A preferred alumina is a pseudo-boehmite or alpha monohydrate of colloidal size. The boehmite is prepared by the thermal dehydration of a gibbsite (bayerite, an amorphous aluminum hydroxide). The material has a range of surface areas from 15 m$^2$/g to 400 m$^2$/g. The preferred alumina sold by Kaiser Chemicals, Baton Rouge, Louisiana, under the trade name, Substrate Alumina - sa, has a B. E. T. of between 300—350 m/g. The typical chemical analysis of the alumina is as follows:

| | |
|---|---|
| Na$_2$O (as is) | 0.01%–0.08% |
| Bayerite (as is) | 0.000%–3.00% |
| Fe$_2$O$_3$ (1000° C.) | 0.020%–0.02% |
| SiO$_2$ (as is) | 0.100%–0.10% |
| Cl (as is) | 0.010%–0.01% |
| SO$_4$ (as is) | 0.050%–0.05% |
| Al$_2$O$_3$ | Remainder |

The typical physical properties of the alumina are as follows:
Bulk density, lbs/ft, calcined at 1100° F.-12.5–17.
Surface Area (1100° F., hr), m/gm-340-300.
Pore Volume (15,000 psia, 1100° F., 1 hr) cc/g-1.5–1.0.
Loss on ignition, % (from ambient to 1000° C.) -25

The alumina is principally used as a catalytic grade alumina substrate which is formed into spheres, extruded, or tabulated. The alumina is a high-chemical purity alumina powder having a low density and high surface area which can be formed into a variety of shapes ready for impregnation with a variety of active catalytic agents. One of the principal functions of the colloidal alumina in the borosilicate composition is to minimize devitrification of the composition subsequent to calcination.

The alkali metal oxide is preferably potassium hydroxide since the potassium ion has several advantageous properties. Since the potassium hydroxide is strongly basic, it increases the pH of the slurry to facilitate forming a high solids slurry from the constituents. The potassium hydroxide further serves as a flux in the composition; and of greater importance, however, it increases the corrosion resistance of the borosilicate composition. With the potassium in the composition, the cellular borosilicate body has a greater resistance to corrosion by non-ferrous liquids. The potassium further serves as a poison to the reaction between the silica and nonferrous liquid metals.

The boric acid in the form of $B_2O_3$ is absorbed onto the surface of the colloidal particles and serves as a flux in the composition. The $B_2O_3$ is preferably supplied as a boric acid solution to the slurry.

EXAMPLES

EXAMPLE 1

The high silica borosilicate batch contained the following constituents expressed as oxides and in parts by weight:

| | |
|---|---|
| 88.0% | SiO$_2$ |
| 4.0% | Al$_2$O$_3$ |
| 6% | B$_2$O$_3$ |
| 1% | KOH |
| 0.5% | Carbon Black |
| 0.5% | Sb$_2$O$_3$ |

The boric acid was dissolved in hot water to form a boric acid solution. The potassium hydroxide was dissolved in water. The SiO$_2$, KOH, Al$_2$O$_3$, C and Sb$_2$O$_3$ were mixed in a high shear mixer; and the boric acid solution was added thereto. After thorough mixing, the material was dried in a drum drier until it contained about 2 percent water by weight. The dried material was ground in a ball mill until the pulverulent glass batch had an average particle size of about 2.5 microns. The ground material was positioned in a graphite tray and then compacted by mechanical shaking. The tray was covered with a graphite plate and introduced into an electrically fired cellulating furnace. The tray with the pulverulent glass batch was subjected to the following heating schedule in the cellulating furnace: An initial temperature of 1200° C. at which temperature the material was maintained for about one-half hour. Thereafter, the temperature within the furnace was raised to 1450° C. and held at that temperature for about 90 minutes. The temperature of the furnace was then reduced to 1200° C., and the tray was removed from the furnace at that elevated temperature. The foamed mass within the graphite tray was then, after cooling, placed in a crusher mixer and 0.4 percent by weight carbon and 0.5 percent by weight antimony trioxide based on the weight of the foamed mass was added thereto to form a precellulated material. The precellulated material was crushed and mixed in the ball mill until an average particle size of about 2.5 microns was obtained. The precellulated material was then placed in a graphite tray and compacted by mechanical shaking. The tray was introduced into a cellulating furnace and subjected to substantially the same heating schedule. After removal from the furnace, the graphite tray was insulated to permit slow cooling of the cellulated body.

The resultant cellular glass body was tested and compared with products made from the same glass batch by melting and also the same glass batch by calcining. The tests indicated that the product obtained by the above-discussed process had substantially the same properties as material obtained by either melting or calcining.

EXAMPLE 2

Twenty percent by weight of the precellulated material, i.e. the material subjected to the single firing, was admixed with 80 percent by weight of the pulverulent batch obtained from the ball mill and with about 0.2 percent by weight carbon and about 0.5 percent by weight antimony trioxide. The material was ground in a ball mill to an average particle size of about 2.5 microns and placed in a graphite tray. The tray was positioned in a cellulating furnace and subjected to substantially the same heating schedule and when removed from the furnace was slowly cooled. The cellular body obtained had substantially the same properties as the cellular body obtained by the cellulation of only the precellulated material.

Figure 2:
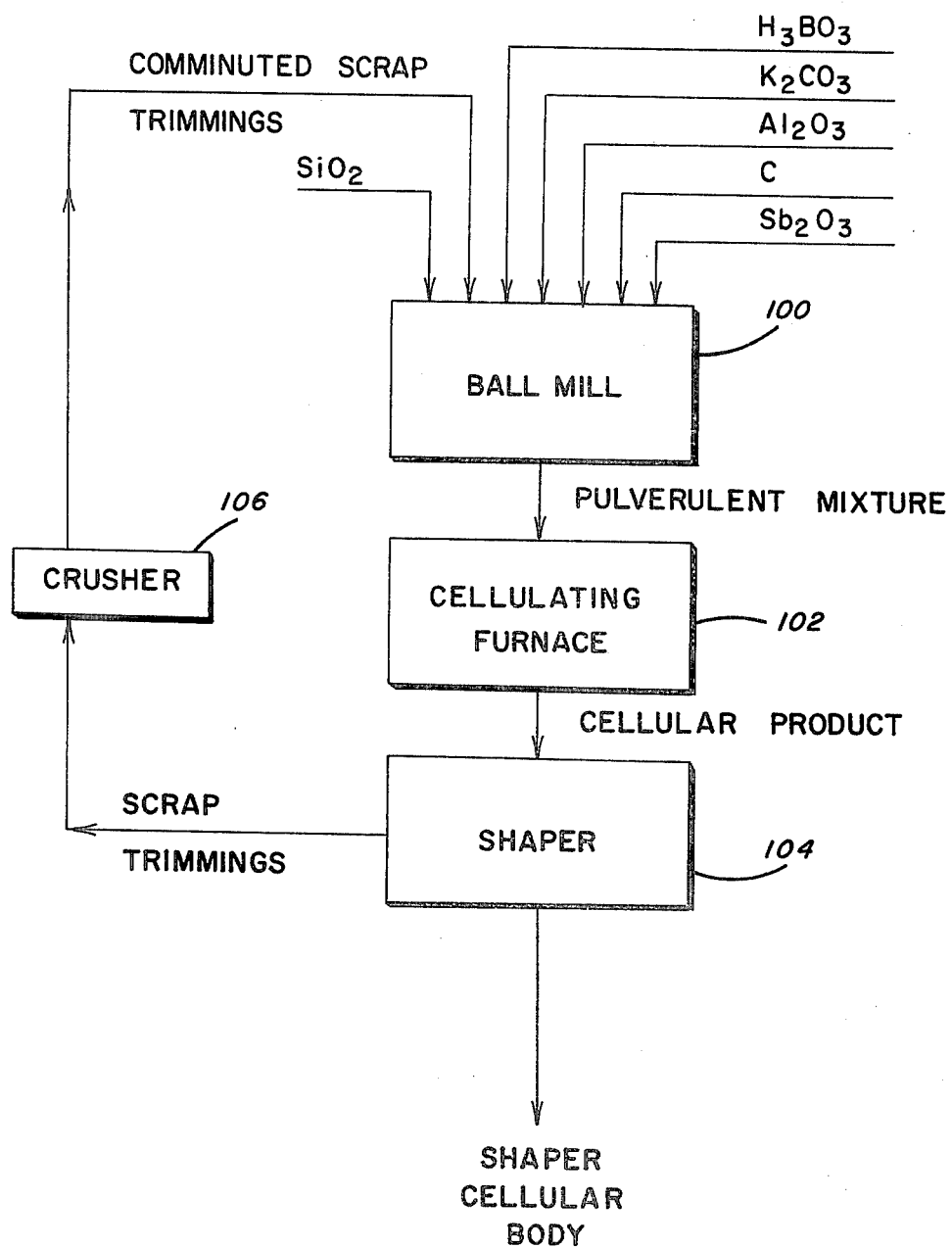
FIG. 2 is a flow diagram of the process for making the cellular body from a composition in which the constituents are admixed and comminuted in a ball mill before being introduced into a cellulating furnace.

In another embodiment of this invention, as illustrated in FIG. 2, the process for making the cellular glass bodies from high silica borosilicate compositions includes introducing boric oxide, potassium carbonate, alumina, channel carbon, antimony trioxide and comminuted scrap trimmings from previously cellulated material into a ball mill designated by the numeral 100. The constituents are both comminuted and mixed in the ball mill for a sufficient period of time, as for example six hours, until a homogeneous admixture of these constituents is formed. The constituents after milling have an average particle size of between about 1 and 4 microns as measured by Fisher Subsieve apparatus. Where desired the comminuted scrap trimmings may be omitted from the first mixture.

Thereafter, amorphous silica is introduced into a ball mill 100 and milled with the above described first mixture for a sufficient period of time to form a homogeneous second mixture containing the constituents of the first mixture and the silica. The second mixture also has an average particle size of between about 1 and 4 microns. It is believed that the use of the amorphous silica and the extending mixing and milling of the constituents in the ball mill results in a mixture which is isotropic and has a degree of homogeneity comparable to that which can be obtained by melting.

A suitable composition for the constituents excluding the cellulating agent and the comminuted scrap trimmings may be the same as the range of constituents previously described. The following is a preferred range of the constituents expressed as oxides and in percent by weight:

| | |
|---|---|
| 85–88 | $SiO_2$ |
| 4 | $Al_2O_3$ |
| 1–1.5 | $K_2O$ |
| 6–10 | $B_2O_3$ |

The most preferred composition of the constituents excluding the cellulating agent and the scrap trimmings consists of the following expressed as oxides and in percent by weight:

| | |
|---|---|
| $SiO_2$ | 88 |
| $Al_2O_3$ | 4 |
| $K_2O$ | 1 |
| $B_2O_3$ | 7 |

The $SiO_2$ in the above composition is preferably an amorphous, precipitated, hydrated silica previously described and the alumina is preferably the alpha monohydrate previously described.

The amount of comminuted scrap trimmings introduced into the first mixture is between about 15 and 40% by weight of the above composition including the silica. The scrap trimmings are introduced into the mill with the alumina, alkali metal oxide, boric oxide and the cellulating agent. A more preferred range of scrap trimmings is between about 20 and 30%. The most preferred is about 25% by weight of the scrap trimmings.

The amount and composition of the cellulating agent expressed in percent by weight of the above enumerated composition and scrap trimmings consists of the following constituents in the following amounts:

| | |
|---|---|
| Carbon | 0.2–0.5% |
| $Sb_2O_3$ | 0.3–0.8% |

The preferred amount of the cellulating agent based on the percent by weight of the above constituents and scrap trimmings is:

| | |
|---|---|
| Carbon | 0.4% |
| $Sb_2O_3$ | 0.5% |

The second mixture including the oxides above enumerated, the cellulating agent and the scrap trimmings is introduced by means of a vibratory feeder into a graphite mold to provide an even packing density of the second mixture in the graphite mold. The mold is preferably covered with a graphite lid and introduced into a cellulating furnace 102. The graphite mold with the homogeneous second mixture positioned therein, upon being introduced into the cellulating furnace 102 was immediately subjected to a temperature of 1200° C. and held at that temperature for a sufficient period of time to rapidly elevate the temperature of the second mixture above the carbon fixation threshold temperature and thus minimize the oxidation of the cellulating agent.

It has been observed that the carbon in a pulverulent mixture oxidizes substantially faster than carbon fixed in a glass structure. It is believed that the carbon is rapidly fixed in a pulverulent mixture and the oxidation of the carbon is minimized when a mixture is introduced into a cellulating furnace which is at a temperature of at least 1200° C. The temperature at which the carbon is fixed in the mixture is designated as the "carbon fixation threshold temperature".

The mold with the pulverulent second mixture therein is subjected to a temperature of at least 1200° C. to attain the carbon fixation threshold temperature and to fix the carbon within the mixture. For a mold having a height of about 3 inches, the time to attain the carbon fixation threshold temperature ranges between about 3 and 6 minutes. It should be understood, this time will vary depending upon the size and height of the mold.

After attaining the carbon fixation threshold temperature, the temperature of the furnace is increased from 1200° C. to a temperature of about 1390° C. It is desirable to slowly raise the temperature from 1200° C. to 1390° C. over a period of about 35 minutes. Again the time to raise the temperature will depend on the size of the mold and the thermal inertia of the material. The temperature of the furnace is maintained at about 1390° C. for a sufficient period of time to soften and coalesce the mixture in the mold and form a body having a substantially uniform cell structure. It has been found that the material will cellulate in a period of about 60 minutes at the above temperature. It should be understood, however, that temperatures and times for cellulation and carbon fixation are dependent on thermal inertia, that is, the temperatures and times depend on the size of the mold and the power of the furnace. It is highly desirable, however, to dissolve the pulverulent material at a relatively rapid rate to prevent devitrification.

After the cellular body is formed within the mold, it is preferred that the temperature is rapidly reduced to about 760° C. and maintained at that temperature for a sufficient period of time to permit the cellular body to cool. The cellular body is thereafter slowly cooled from 760° C. to ambient temperature. Preferably, the mold with the cellular body therein is wrapped in suitable insulation to slowly cool the cellular bodies therein to ambient temperature. Where desired after the cellular body is formed within the mold the temperature may be rapidly reduced to about 1100° C. and when that temperature is reached the mold is removed from the furnace and permitted to slowly cool to ambient temperature.

After the cellular bodies are cooled to ambient temperature, the cellular bodies are removed from the mold and then introduced into a suitable shaper 104 such as saw devices or the like where the cellular bodies are trimming and finished to a preselected configuration. The scrap trimmings are removed from the shaper and introduced into a crusher 106 where the scrap trimmings are comminuted before they are introduced into the ball mill. As previously discussed, preselected amounts of comminuted scrap trimmings from the crusher 106 are introduced into the ball mill 100 to be admixed with the constituents therein as previously described.

The shaped cellular bodies made from the preferred compositions have the following physical properties:

| | |
|---|---|
| Average Density | 25 pcf |
| Compressive Strength | 600 psi |
| Flexural Strength | 200 psi |
| Elastic Modulus | 600,000 psi |
| Coefficient of Thermal Expansion | $13 - 16 \times 10^{-7}$/°C. |

The cellular bodies had the following thermal conductivities expressed in watts/meter/°K at the following mean temperatures in degrees centigrade:

| Mean Temperature °C. | Thermal Conductivity Watts/Meter/°K. |
|---|---|
| 24 | .155 |
| 246 | .205 |
| 468 | .285 |
| 690 | .44 |

The apparent viscosity points for the cellular material are as follows:

| | °F. | °C. |
|---|---|---|
| Strain Point (n = $10^{14.5}$ poise) | 1081–1124 | 583–607 |
| Annealing Point (n = $10^{13}$ poise) | 1234–1265 | 668–685 |
| Softening Point (n = $10^{7.6}$ poise) | 2078–2177 | 1137–1192 |

EXAMPLE 3

The high borosilicate mixture contains the following constituents expressed as oxides and in parts by weight:

| | |
|---|---|
| 88% | $SiO_2$ |
| 4% | $Al_2O_3$ |
| 1% | $K_2O$ |
| 7% | $B_2O_3$ |

Scrap trimmings of previously formed cellular bodies in an amount of 25% by weight of the above mixture are added thereto. The cellulating agent expressed in parts by weight of the above mixture and scrap trimmings added to the mixture included 0.4% by weight channel carbon and 0.5% by weight $Sb_2O_3$.

The boric oxide, potassium carbonate, alumina, channel carbon, antimony trioxide and comminuted scrap trimmings were introduced into a ball mill and were subjected to comminution and mixing in the ball mill for a period of about six hours. Thereafter the amorphous silica was introduced into the ball mill and milled with the first mixture and comminuted scrap trimmings for a period of about two hours. After milling for two hours, the second mixture was screened through a 40 mesh screen to remove chips from the balls in the ball mill.

The mix was stored in premeasured batches in plastic bags to minimize moisture absorbtion during storage. Fourteen pounds of the mixture was introduced by means of a vibratory feeder into a rectangular graphite mold having dimensions of about 20"×24"×3". The vibratory feeder introduced the pulverulent material into the graphite mold and provided an even packing density. A graphite cover was positioned on top of the mold and the mold was introduced into a cellulating furnace. The cellulating furnace was at a temperature of 1200° C. and the mold was immediately subjected to that elevated temperature for a period of about three minutes when the material attained a carbon fixation threshold temperature. Thereafter, the temperature of the mold was slowly increased from 1210° C. to 1390° C. The period of time required to attain the higher temperature was approximately 35 minutes. The mold was maintained at 1390° C. for a period of 60 minutes during which the mixture coalesced and gasified the cellulating agent to form a cellular body. Subsequently, the temperature of the mold was reduced to 1093° C. as rapidly as practical and was removed from the furnace and permitted to cool at a controlled rate to ambient temperature during a period of about 12 hours, After removal from the furnace the molds are covered with insulating material to control the rate of cooling.

The shaped cellular body was then removed from the mold and subjected to shaping in which a portion of the top surface of the cellular body was trimmed and the sides and faces were trimmed to expose the cellular structure. The scrap trimmings were returned to a crusher for later use in making additional cellular bodies.

The resultant cellular bodies were tested in a similar manner as examples 1 and 2 and the tests indicated the produce had the physical properties previously enumerated.

EXAMPLE 4

The percent by weight of scrap trimmings from previously formed cellular bodies was reduced to about 20 percent by weight of the other constituents and the channel carbon in the cellulating agent was increased to 0.5% by weight. Substantially the same process steps were followed as set forth in example 3 and the resultant cellular bodies had substantially the same physical properties as the cellular bodies formed in example 3 with the exception that the density was slightly lower.

EXAMPLE 5

The scrap trimmings of previously formed cellular bodies was increased to an amount of about 30% by weight of the other constituents and the channel carbon in the cellulating agent was reduced to about 0.35%.

Again, substantially the same process steps were followed as set forth in example 3 and the cellular bodies formed had substantially the same physical properties as the cellular bodies of example 3 with the exception that the density was slightly higher.

According to the provisions of the Patent Statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. A method of making a cellular body from a high borosilicate composition comprising,
   mixing at a temperature below the melting temperature of any of the constituents amorphous silica having particles of submicron size, alumina, boric acid, less than 3% by weight alkali metal oxide and a cellulating agent and forming a pulverulent homogeneous mixture, said mixture containing more than 80% by weight amorphous silica, and
   thereafter subjecting said pulverulent homogeneous mixture to a temperature sufficient to coalesce but insufficient to further homogenize said homogeneous mixture, said temperature being sufficient to gasify said cellulating agent and form a cellular body having a substantially uniform cell structure.

2. A method of making a cellular body from a high borosilicate composition as set forth in claim 1 which includes,
   subjecting said pulverulent homogeneous mixture to a temperature of between about 1390° C. and 1450° C. for a sufficient period of time to coalesce said homogeneous mixture and gasify said cellulating agent to form a cellular body having a substantially uniform cell structure.

3. A method of making a cellular body from a high borosilicate glass composition as set forth in claim 1 which includes,
   subjecting said pulverulent homogeneous mixture to an initial temperature of at least 1200° C.,
   maintaining said pulverulent homogeneous mixture at said initial temperature until said pulverulent homogeneous mixture attains the carbon fixation temperature,
   thereafter subjecting said pulverulent homogeneous mixture to a higher temperature sufficient to coalesce said homogeneous mixture and gasify said cellulating agent to form a cellular body having a substantially uniform cell structure.

4. A method of making a cellular body from a high borosilicate composition as set forth in claim 1 in which,
   said constituents of said pulverulent homogeneous mixture excluding said cellulating agent and expressed in weight percent as oxides comprise between about 80 and 88 percent amorphous silica, about 4 percent alumina, between about 5 and 13 percent boric oxide and between about 1 and 3 percent alkali metal oxide.

5. A method of making a cellular body from a high borosilicate composition as set forth in claim 4 in which,
   said cellulating agent expressed as percent by weight of the other constituents comprises between about 0.2 and 0.5 percent carbon and between about 0.3 and 0.8 percent antimony trioxide.

6. A method of making a cellular body from a high borosilicate composition comprising,
   preparing a pulverulent homogeneous mixture from constituents comprising amorphous silica, alumina, boric acid, an alkali metal oxide and a cellulating agent, said mixture containing more than 80% by weight amorphous silica,
   thereafter subjecting said pulverulent homogeneous mixture to a temperature sufficient to coalesce said homogeneous mixture and gasify said cellulating agent to form a cellular body having a substantially uniform cell structure,
   comminuting a portion of said cellular body,
   mixing between about 15 to 40 percent by weight of said comminuted cellular body with between about 60 to 85 percent by weight of said pulverulent homogeneous mixture to form a pulverulent homogeneous mixture containing said comminuted cellular body,
   thereafter subjecting said pulverulent homogeneous mixture containing said comminuted cellular body to a temperature sufficient to coalesce said homogeneous mixture and gasify said cellulating agent to form a cellular body having a substantially uniform cell structure.

7. A method of making a cellular body from a high silica borosilicate composition comprising,
   preparing an aqueous slurry from a mixture comprising amorphous silica, alumina, boric acid, alkali metal hydroxide and a cellulating agent, said mixture containing more than 80 percent by weight precipitated amorphous silica,
   drying said slurry and forming particles of the solid constituents in said slurry,
   forming a pulverulent batch from said particles of the solid constituents in said slurry,
   thereafter subjecting said pulverulent batch to a temperature sufficient to coalesce said pulverulent batch and gasify said cellulating agent to form a foam-like mass having a nonuniform cell structure,
   comminuting said foam-like mass to form a precellulated material,
   mixing said precellulated material with said cellulating agent to form a mixture of precellulated material and cellulating agent, and
   thereafter subjecting said mixture of precellulated material and cellulating agent to a temperature sufficient to coalesce said precellulated material and gasify said cellulating agent and cellulate and precellulated material to form a cellular body having substantially uniform cell structure.

8. A method of making a cellular body from a high silica borosilicate composition as set forth in claim 7 which includes,
   comminuting said particles of the solid consitutents in said slurry to form said pulverulent batch.

9. A method of making a cellular body from a high silica borosilicate composition as set forth in claim 7 which includes,
   mixing said precellulated material, cellulating agent and pulverulent batch in preselected proportions, and
   thereafter subjecting said mixture of precellulated material, cellulating agent and pulverulent batch at a temperature sufficient to coalesce said last named mixture and gasify said cellulating agent and cellulate said last named mixture to form a cellular body having a substantially uniform cell structure.

10. A method of making a cellular body from a high silica borosilicate composition as set forth in claim 9 which includes,
  mixing between about 20 percent to 30 percent by weight of said precellulated material with between about 70 percent to 80 percent by weight of said pulverulent batch.

11. A method of making a cellular body from a high silica borosilicate composition as set forth in claim 7 in which said cellulating agent includes,
  a mixture of pulverulent carbon and antimony trioxide.

12. A method of making a cellular body from a high silica borosilicate composition as set forth in claim 7 which includes,
  subjecting said precellulated material and cellulating agent to a temperature of about 1450° C. for about 90 minutes to cellulate said precellulated material to form said cellular body.

13. A method of making a cellular body from a high silica borosilicate composition as set forth in claim 12 which includes,
  subjecting said pulverulent batch to a temperature of about 1450° C. for about 90 minutes to form said foam-like mass.

14. A method of making a cellular body from a high silica borosilicate composition as set forth in claim 7 in which said pulverulent batch has an average particle size of about 2.5 microns.

15. A method of forming a precellulated material suitable for cellulation into a cellular body having a substantially uniform cell structure comprising,
  preparing an aqueous slurry from a mixture comprising amorphous silica, alumina, boric acid, alkali metal hydroxide and a cellulating agent, said mixture containing more than 80 percent by weight silica,
  drying said slurry and forming particles of the solid constituents in said slurry,
  forming a pulverulent batch from said particles of the solid constituents in said slurry,
  thereafter subjecting said pulverulent batch to a temperature sufficient to coalesce said pulverulent batch and gasify said cellulating agent to form a foam-like mass having a nonuniform cell structure, and
  comminuting said foam-like mass to form a precellulated material suitable for cellulation into a cellular body having a substantially uniform cell structure.

16. A method of making a cellular body from a high silica borosilicate composition comprising,
  preparing an aqueous slurry from a mixture consisting essentially of amorphous silica, alumina, boric acid, alkali metal hydroxide, and a cellulating agent, said mixture having between 80 and 88 percent by weight amorphous silica,
  drying said slurry and forming aggregates of the solid constituents in said slurry,
  comminuting said aggregates to a size of about 2.5 microns and forming therefrom a pulverulent batch,
  thereafter subjecting said pulverulent batch to a temperature of about 1450° C. for a sufficient time to coalesce said pulverulent batch and gasify said cellulating agent to form a foam-like mass having a nonuniform cell structure,
  comminuting said foam-like mass to a size of about 2.5 microns to form a precellulated material therefrom,
  mixing said precellulated material with about 1 percent by weight cellulating agent to form a mixture of precellulated material and cellulating agent,
  mixing between about 20 to 30 percent by weight of said mixture of precellulated material and cellulating agent with between about 70 and 80 percent by weight pulverulent batch, and
  thereafter subjecting said last named mixture to a temperature of about 1450° C. for a sufficient period of time to coalesce said precellulated material and said pulverulent batch and gasify said cellulating agent and form a cellular body having a substantially uniform cell structure.

17. A method of making a cellular body from a high borosilicate composition comprising,
  comminuting and mixing constituents at a temperature below the melting temperature of any of the constituents comprising alumina, boric acid, alkali metal salt and a cellulating agent to form a first mixture,
  adding amorphous silica having particles of submicron size to said first mixture to form a second mixture, said second mixture containing more than 80 percent by weight amorphous silica and less than 3 percent by weight alkali metal oxide, and
  thereafter subjecting said second mixture to a temperature sufficient to coalesce said second mixture but insufficient to further homogenize said second mixture, said temperature being sufficient to gasify said cellulating agent and form a cellular body having a substantially uniform cell structure.

18. A method of making a cellular body from a high borosilicate composition as set forth in claim 17 which includes,
  comminuting and mixing said first mixture in a ball mill for a sufficient period of time to form a homogeneous first mixture.

19. A method of making a cellular body from a high borosilicate composition as set forth in claim 18 which includes,
  comminuting and mixing said first mixture in a ball mill for about six hours to form a homogeneous first mixture.

20. A method of making a cellular body from a high borosilicate composition as set forth in claim 17 in which,
  said first mixture has an average particle size between 1 and 4 microns.

21. A method of making a cellular body from a high borosilicate composition as set forth in claim 17 which includes,
  milling said second mixture in a ball mill for a sufficient period of time to form a homogeneous second mixture.

22. A method of making a cellular body from a high borosilicate composition as set forth in claim 21 which includes,
  milling said second mixture in a ball mill for about two hours to form a homogeneous second mixture.

23. A method of making a cellular body from a high borosilicate composition as set forth in claim 17 in which,
  said second mixture has an average particle size between 1 and 4 microns.

24. A method of making a cellular body from a high borosilicate composition as set forth in claim 17 which includes, comminuting a portion of said cellular body, mixing said comminuted cellular body with said first mixture in a ratio of between about 20 to 30 percent by weight of said comminuted cellular body and between about 70 to 80 percent by weight of said second mixture.

25. A method of making a cellular body from a high borosilicate composition as set forth in claim 17 in which, said constituents in said second mixture excluding said cellulating agent and expressed in weight percent as oxides comprise about 88 percent amorphous silica, about 4 percent alumina, about 7 percent boric oxide and about 1 percent potassium oxide.

26. A method of making a cellular body from a high borosilicate composition as set forth in claim 25 in which, said cellulating agent expressed as percent by weight of said second mixture comprises about 0.4 percent channel carbon and about 0.5 percent antimony trioxide.

27. A method of making a cellular body from a high borosilicate composition comprising, comminuting and mixing alumina, boric oxide, an alkali metal salt and a cellulating agent in a ball mill for a sufficient period of time to form a pulverulent homogeneous mixture having an average particle size of between 1 and 4 microns, thereafter adding amorphous silica having particles of a submicron size to said pulverulent homogeneous first mixture to form a second mixture, said second mixture containing more than 80 percent by weight amorphous silica and less than 3 percent by weight alkali metal oxide, milling said second mixture in a ball mill for a sufficient period of time to form a pulverulent homogeneous second mixture, positioning a preselected quantity of said pulverulent homogeneous second mixture in a mold, subjecting said mold to an initial temperature of about 1200° C. for a sufficient period of time for said pulverulent homogeneous second mixture to attain a carbon fixation temperature, thereafter subjecting said mold to a cellulating temperature of about 1390° C. for a sufficient period of time to coalesce but insufficient to further homogenize said pulverulent homogeneous mixture, said temperature being sufficient to gasify said cellulating agent and form a cellular body having a substantially uniform cell structure.

28. A method of making a cellular body from a high borosilicate composition as set forth in claim 27 which includes, increasing the temperature to which the mold is subjected from 1200° C. to 1390° C. at a controlled rate of about 5° C. per minute.

29. A method of making a cellular body from a high borosilicate composition as set forth in claim 27 which includes, comminuting a portion of said cellular body, mixing said comminuted cellular body with said first mixture in a ratio of about 25 percent by weight of said comminuted cellular body and about 75 percent by weight of said second mixture, thereafter positioning said second mixture with said comminuted cellular body added thereto in said mold.

30. A method of making a cellular body from a high borosilicate composition comprising, mixing at ambient temperature constituents comprising amorphous silica having particles of submicron size, alumina, boric acid, an alkali metal oxide and a cellulating agent and forming a pulverulent homogeneous mixture, said mixture containing more than 80% by weight amorphous silica and less than 3% by weight alkali metal oxide, and thereafter subjecting said pulverulent homogeneous mixture to a temperature sufficient to coalesce but insufficient to further homogenize said homogeneous mixture, said temperature being sufficient to gasify said cellulating agent and form a cellular body having a substantially uniform cell structure.

* * * * *